(12) United States Patent
Zheng et al.

(10) Patent No.: US 11,611,072 B2
(45) Date of Patent: *Mar. 21, 2023

(54) COATING ON NICKELATE CATHODE MATERIALS

(71) Applicant: Energizer Brands, LLC, St. Louis, MO (US)

(72) Inventors: Guanghong Zheng, St. Louis, MO (US); Weiwei Huang, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/845,378

(22) Filed: Apr. 10, 2020

(65) Prior Publication Data

US 2020/0328411 A1 Oct. 15, 2020

Related U.S. Application Data (60) Provisional application No. 62/832,383, filed on Apr. 11, 2019.

(51) Int. Cl.
*H01M 4/525* (2010.01)
*H01M 6/04* (2006.01)
(Continued)

(52) U.S. Cl.
CPC ......... *H01M 4/366* (2013.01); *H01M 4/0433* (2013.01); *H01M 4/08* (2013.01); *H01M 4/30* (2013.01); *H01M 4/32* (2013.01); *H01M 4/525* (2013.01); *H01M 4/62* (2013.01); *H01M 4/624* (2013.01); *H01M 4/625* (2013.01); *H01M 6/04* (2013.01); *H01M 10/28* (2013.01); *H01M 10/30* (2013.01); *H01M 2004/028* (2013.01); *H01M 2300/0014* (2013.01)

(58) Field of Classification Search
CPC ........ H01M 4/366; H01M 4/32; H01M 4/525; H01M 10/28; H01M 10/30; H01M 4/625; H01M 6/04; H01M 10/24
See application file for complete search history.

(56) References Cited

U.S. PATENT DOCUMENTS 6,132,639 A † 10/2000 Komatsu
6,337,155 B1 † 1/2002 Takei
(Continued)

FOREIGN PATENT DOCUMENTS

WO 2014123913 † 8/2014
WO WO 2014/123913 A1 8/2014

OTHER PUBLICATIONS

European Patent Office, Extended European Search Report received for Application No. 20168592.2, dated Aug. 18, 2020, 11 pages.
(Continued)

*Primary Examiner* — James Lee
(74) *Attorney, Agent, or Firm* — Alston & Bird LLP (57) ABSTRACT

Alkaline electrochemical cells are provided, containing cathodes with a nickel compound active material, wherein active material particles are coated with at least one of a number of materials so as to improve the shelf life of the electrochemical cell. Methods of preparing such cathodes and electrochemical cells are also provided.

19 Claims, 7 Drawing Sheets

(51) Int. Cl.
*H01M 10/24* (2006.01)
*H01M 4/36* (2006.01)
*H01M 4/04* (2006.01)
*H01M 4/08* (2006.01)
*H01M 4/30* (2006.01)
*H01M 4/32* (2006.01)
*H01M 4/62* (2006.01)
*H01M 10/28* (2006.01)
*H01M 10/30* (2006.01)
*H01M 4/02* (2006.01)

(56) References Cited

U.S. PATENT DOCUMENTS

| | | | |
|---|---|---|---|
| 6,492,062 | B1 † | 12/2002 | Wang |
| 7,273,680 | B2 † | 9/2007 | Durkot |
| 8,298,706 | B2 † | 10/2012 | Christian |
| 8,334,067 | B2 † | 12/2012 | Durkot |
| 9,028,564 | B2 † | 5/2015 | Nelson |
| 9,793,542 | B2 | 10/2017 | Nelson et al. |
| 2007/0092789 | A1 | 4/2007 | Okada et al. |
| 2009/0286157 | A1* | 11/2009 | Chen ............... H01M 4/0421 252/182.1 |
| 2010/0119947 | A1* | 5/2010 | Lee ............... H01M 4/0471 429/231.95 |
| 2013/0177821 | A1* | 7/2013 | Tsuchida ............... H01M 4/131 429/323 |
| 2014/0329145 | A1* | 11/2014 | Koch ............... H01M 4/32 429/223 |
| 2015/0188144 | A1 † | 7/2015 | Shin |
| 2018/0006308 | A1* | 1/2018 | Zimmerman ....... H01M 10/054 |
| 2018/0331361 | A1 | 11/2018 | Nelson et al. |
| 2020/0203713 | A1* | 6/2020 | Slezak ............... H01M 4/622 |

OTHER PUBLICATIONS

Arai and Sakurai, "Characteristics of $Li_xNiO_2$ obtained by chemical delithiation," J. Power Sources, 81-82:401-405, (1999).

Fu et al., "β-CoOOH coated spherical β-NiOOH as the positive electrode material for alkaline Zn—NiOOH battery," J. Power Sources, 164:916-920, (2007).

King et al., "Atomic layer deposition on particles using a fluidized bed reactor with in situ mass spectrometry," Surface & Coatings Technology, 201:9163-9171, (2007).

Wang et al., "Enhanced capacity and stability of $K_2FeO_4$ cathode with poly(3-hexylthiophene) coating for alkaline super-iron battery," Electrochimica Acta, 213:132-139, (2016).

\* cited by examiner
† cited by third party

COATING ON NICKELATE CATHODE MATERIALS

CROSS-REFERENCE TO RELATED APPLICATIONS

This application claims the benefit of U.S. Provisional Application Ser. No. 62/832,383, filed Apr. 11, 2019, which is incorporated herein by reference in its entirety.

BACKGROUND

Alkaline electrochemical cells are commercially available in cell sizes commonly known as LR6 (AA), LR03 (AAA), LR14 (C), and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

High valent nickel materials including nickel oxyhydroxide (NiOOH), nickel dioxide ($NiO_2$) and various forms of nickel oxides and nickel oxyhydroxides are useful as cathode materials in alkaline systems due to their high capacity and cell voltage. However, these materials are thermodynamically unstable in aqueous electrolytes, resulting in the reduction of the nickel cathode (loss of electrode capacity). Therefore, the shelf life of alkaline batteries with high valent nickel cathodes is limited compared to batteries containing some other cathode materials.

It was in an effort to overcome the limitations of the above-described cells, and other such cells, that the present embodiments were designed.

BRIEF SUMMARY

An embodiment is an alkaline electrochemical cell, comprising:
a) a container; and
b) an electrode assembly disposed within the container and comprising a positive electrode, a negative electrode, a separator located between the positive electrode and the negative electrode, and an alkaline electrolyte, and
  wherein the positive electrode comprises coated active material particles, said coated active material particles comprising active material and a coating, wherein the active material comprises a nickel compound.

An embodiment is a method of producing any one of the above alkaline electrochemical cells, comprising:
i) providing a positive electrode mix comprising
  1) coated active material particles,
  2) binder,
  3) conductive carbon, and
  4) electrolyte, ii) forming a plurality of rings from the positive electrode mix; and
iii) inserting the rings into a container.

An embodiment is a method of producing any one of the above alkaline electrochemical cells, comprising:
i) providing a positive electrode mix comprising
  1) coated active material particles,
  2) binder,
  3) conductive carbon, and
  4) electrolyte, and
ii) using a ram to mold the positive electrode mix into a solid tubular configuration.

DETAILED DESCRIPTION

Various embodiments now will be described more fully hereinafter with reference to the accompanying drawing, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, a "coating" refers to at least one layer of material ("coating material") surrounding a particle or agglomerate of an active material in a cathode of an electrochemical cell. The layer may be of any thickness, including as thin as a single molecule layer.

As used herein, "improvement" with respect to storage stability means that the storage stability (i.e. "shelf-life") is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, "oxide" refers to a chemical compound that contains at least one oxygen atom and one other element. As used herein, "nickel oxide" refers to any nickel-containing oxide. Nickel oxides may comprise other cations and anions. Non-limiting examples include nickel dioxide ($NiO_2$), and nickel oxides (such as nickel (IV) oxides).

As used herein, "oxyhydroxide" refers to a chemical compound or complex containing an oxide group and a hydroxide group. As used herein, "nickel oxyhydroxide" refers to any nickel-containing oxyhydroxide. Nickel oxyhydroxides may comprise other cations and anions. A non-limiting example is nickel oxyhydroxide (NiOOH).

As used herein, an "alkali metal" is an element from Group IA of the periodic table. Non-limiting examples include K, Rb, and Cs.

As used herein, an "alkaline earth metal" is an element from Group IIA of the periodic table. Non-limiting examples include Mg, Ca, and Sr.

As used herein, a "transition metal" is an element from Groups IB-VIIIB of the periodic table. Non-limiting examples include Co, Mn, Zn, Y, Nb, and Ti.

As used herein, "other metals" includes all metals on the periodic table not included in the previously-mentioned Groups, including Al, Ga, In, Sn, Tl, Pb, and Bi.

As used herein, a "primary" electrochemical cell is a non-rechargeable (i.e. disposable) electrochemical cell. A "secondary" electrochemical cell is a rechargeable electrochemical cell.

As used herein, "high-valent" nickel refers to nickel having an average oxidation state of at least 3+.

As used herein, "conductivity" refers to a given material's ability to conduct electric current. This is typically measured in Siemens per meter (S/m).

An embodiment is an alkaline electrochemical cell, comprising:
 a) a container; and
 b) an electrode assembly disposed within the container and comprising a positive electrode, a negative electrode, a separator located between the positive electrode and the negative electrode, and an alkaline electrolyte, and
  wherein the positive electrode comprises coated active material particles, said coated active material particles comprising active material and a coating, wherein the active material comprises a nickel compound.

In an embodiment, the nickel compound is a nickel oxide or a nickel oxyhydroxide.

In an embodiment, the nickel compound is a nickel oxide. In a further embodiment, the nickel oxide is selected from the group consisting of a nickel (IV) oxide, nickel dioxide ($NiO_2$), $Li_xNiO_2$ (lithium nickelate), wherein $0<x\leq1$, and $Li_xA_yNi_{1+a-z}M_zO_2$, wherein $0\leq x\leq1$, $0\leq y\leq0.3$, $0\leq a\leq0.2$, and $0\leq z\leq0.3$, wherein A comprises one or more alkali metals, and wherein M comprises one or more alkaline earth metal, transition metal, other metal, or any combination thereof.

In an embodiment, the active material is nickel dioxide.

In an embodiment, the active material is a nickel oxyhydroxide. In a further embodiment, the active material is nickel oxyhydroxide (NiOOH).

In an embodiment, the coating comprises an insulator. In a further embodiment, the insulator is an organic material. In a further embodiment, the organic material is selected from the group consisting of polyetherimide, cross-linked polyvinyl alcohol, polyacrylic acid, polyethylene and polypropylene. In an alternative embodiment, the insulator is an inorganic material. In a further embodiment, the inorganic material is selected from the group consisting of $TiO_2$, $ZrO_2$, $Y_2O_3$, $La_2O_3$, $Nb_2O_5$, and $Ta_2O_5$.

In an embodiment, the coating comprises an electronic conductor or semi-conductor. In a further embodiment, the electronic conductor or semi-conductor is selected from the group consisting of manganese oxides, carbon, conductive polymers, cobalt oxyhydroxide, and metallic materials. In a further embodiment, the electric conductor or semi-conductor is a manganese oxide having the formula $MnO_x$, wherein x is from 1.5-2.0, inclusive. In an alternative embodiment, the electronic conductor or semi-conductor is a conductive polymer selected from the group consisting of polyaniline, polystyrene sulfonate, and poly(3-hexylthiophene). In an embodiment, the metallic material comprises gold.

In an embodiment, the coating comprises a second nickel compound, wherein the second nickel compound comprises nickel having a lower oxidation state than that of the nickel in the active material. In a further embodiment, the second nickel compound is nickel oxyhydroxide or nickel hydroxide.

In an embodiment, the coating has a thickness of about 0.5 nm-1 μm, or about 1.0 nm-100 nm, or about 2 nm-50 nm, or about 5 nm-20 nm.

In an embodiment, the weight ratio of active material to coating is greater than about 3, or is about 10-1000, or about 200-800, or about 300-500.

In an embodiment, the coating comprises a layer, said layer comprising the first coating material and the second coating material.

In an embodiment, the coating comprises a first layer and a second layer, wherein the first layer consists essentially of the first coating material and the second layer consists essentially of the second coating material.

In an embodiment, the electrochemical cell is a primary cell. In an alternative embodiment, the electrochemical cell is a secondary cell.

In an embodiment, the negative electrode comprises an active material selected from the group consisting of zinc, magnesium, aluminum and silicon.

In an embodiment, the electrochemical cell comprises an electrolyte solution which comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$). In a further embodiment, the electrolyte solution comprises KOH.

In an embodiment, the electrochemical cell has a voltage of 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

An embodiment is a method of producing any one of the above alkaline electrochemical cells, comprising:
i) providing a positive electrode mix comprising
   1) coated active material particles,
   2) binder,
   3) conductive carbon, and
   4) electrolyte,
ii) forming a plurality of rings from the positive electrode mix; and
iii) inserting the rings into a container.

An embodiment is a method of producing any one of the above alkaline electrochemical cells, comprising:
i) providing a positive electrode mix comprising
   1) coated active material particles,
   2) binder,
   3) conductive carbon, and
   4) electrolyte, and
ii) using a ram to mold the positive electrode mix into a solid tubular configuration.

Figure 1:
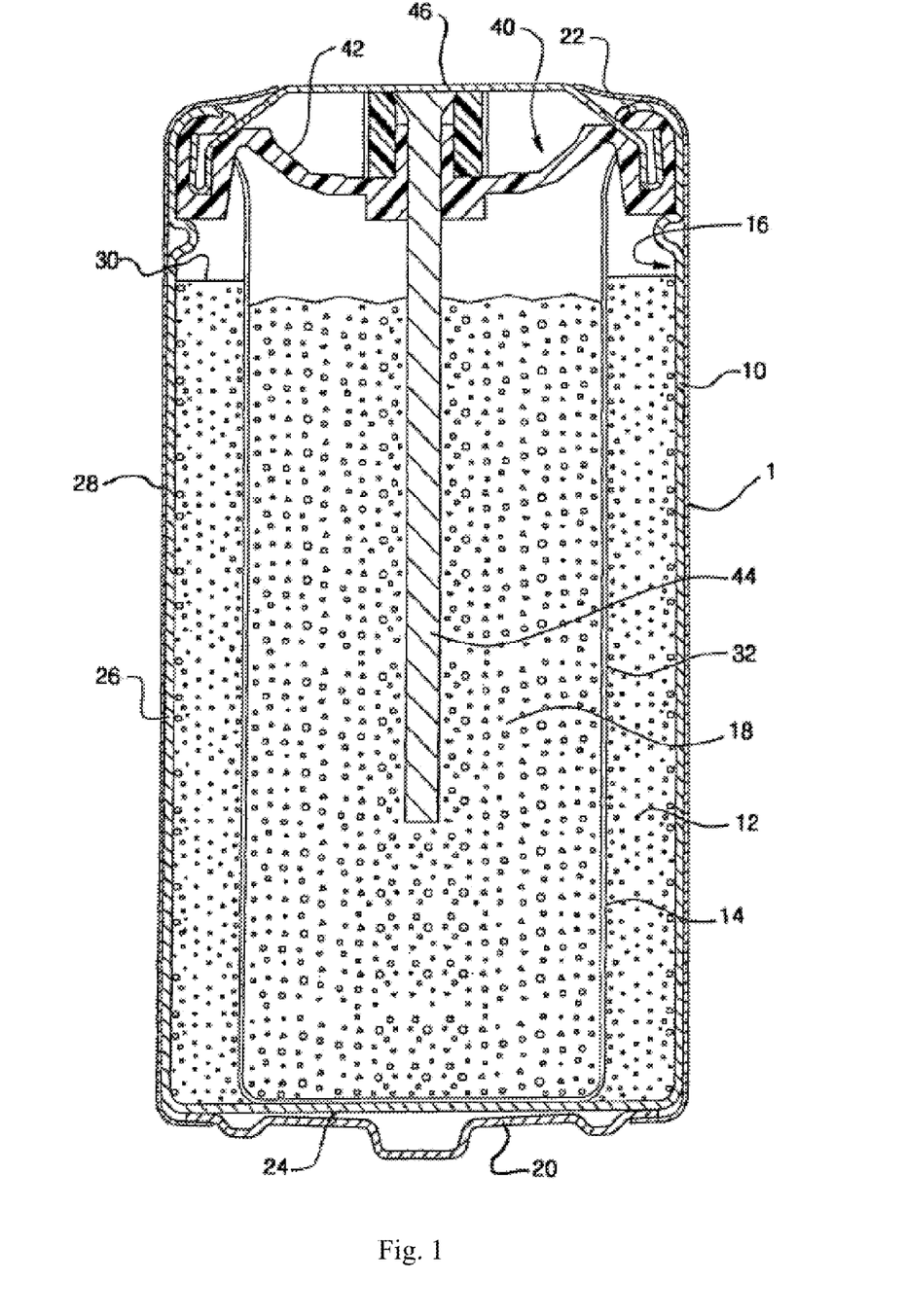
FIG. 1 is a cross-sectional elevational view of an alkaline electrochemical cell of an embodiment.

In an embodiment, the method further comprises coating positive electrode active material particles by a method selected from the group consisting of atomic layer deposition, chemical deposition, chemical vapor deposition, electrolytic deposition or plating, electroless deposition or plating, carbon evaporation, laser ablation, and arc discharge The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and other electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

The aqueous alkaline electrolyte may comprise an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (median diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

Second electrode 12, also referred to herein as the positive electrode or cathode, has a nickel compound as its electrochemically active material. The active material is present in an amount generally from about 80 to about 98 weight percent and preferably from about 81 to 97 weight percent based on the total weight of the positive electrode, i.e., nickel compound, binder, graphite, positive electrode electrolyte, and additives, if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed (known as impact molding). Second electrode 12 has a ledge 30 and an interior surface 32 as illustrated in FIG. 1. Alternatively, the positive electrode may be formed by pre-forming a plurality of rings from the mixture comprising the nickel compound, and then inserting the rings into the container to form the tubular-shaped second electrode (known as ring molding). The cell shown in FIG. 1 would typically include 3 or 4 rings.

The nickel compound may be, nickel oxyhydroxide (NiOOH), or a nickelate. As non-limiting examples, the nickel oxide may be a nickel (IV) oxide, nickel dioxide ($NiO_2$), or $Li_xNiO_2$ (lithium nickelate, where $0<x\leq1$), or $Li_xA_yNi_{1+a-z}MzO_2$ (where $0\leq x\leq1$, $0\leq y\leq0.3$, $0\leq a\leq0.2$, and $0\leq z\leq0.3$, wherein A comprises one or more alkali metals, and M comprises one or more alkaline earth metal, transition metal, other metal, or any combination thereof).

The active material may be in the form of particles having any size suitable for use in an electrode mixture. In an embodiment, the active material is in the form of particles having an average size of approximately 1-20 microns, or 1-10 microns, or 1-5 microns, or 7-10 microns. In an embodiment, the active material is in the form of particles having a size ranging from 0.1-40 microns.

The cathode also comprises a binder, which may be any binder known in the art. Non-limiting examples of binders include polyvinylidene fluoride (PVDF), polyethylene, copolymers based on polystyrene and ethylene/propylene, such as those available under the Kraton® trade name, sold by Kraton Corporation (Houston, Tex.), polytetrafluoroethene (PTFE), poly(3,4-ethylenedioxythiophene) (PEDOT) copolymers, polystyrene sulfonate (PSS), and PEDOT:PSS polymer mixtures. The binder may be in the form of particles having any size suitable for use in an electrode mixture.

The cathode also comprises graphite. The graphite may be expanded graphite. The graphite may be in the form of particles having any size suitable for use in an electrode mixture. In an embodiment, the binder is in the form of particles having an average size ranging from nanoparticle-sized to 65 microns. In an embodiment, the maximum size of the graphite particles is 110 microns.

The listed particle sizes may refer to sizes of coated or uncoated particles. The listed particle sizes may also apply to sizes of agglomerates of particles.

Particles or agglomerates of the active material are coated. The coating may be performed by any method known in the art. Such methods atomic layer deposition (ALD), chemical deposition, chemical vapor deposition (CVD), electrolytic deposition or plating, electroless deposition or plating, carbon evaporation, laser ablation, and arc discharge. Ideally, the coating is of a uniform thickness, but this is not required.

An example of an additional cathode additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as Coathylene® (Axalta Coating Systems, Glen Mills, Pa.), and calcium stearate.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12.

Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

DISCUSSION AND EXAMPLES

Example 1

Particles of a nickelate have a 5 nm-thick carbon coating deposited on them by carbon evaporation. These coated nickelate particles are incorporated into a cathode, which is then incorporated into an alkaline electrochemical cell comprising a KOH electrolyte solution. The cathode exhibits greater storage stability than an otherwise identical cathode comprising uncoated nickelate particles as the active material.

Example 2

Particles of nickel oxide have a 5 nm-thick $TiO_2$ coating deposited on them by chemical vapor deposition. These coated nickelate particles are incorporated into a cathode, which is then incorporated into an alkaline electrochemical cell comprising a KOH electrolyte solution. The cathode exhibits greater storage stability than an otherwise identical cathode comprising uncoated nickelate particles as the active material.

Example 3

Particles of nickel oxyhydroxide have a 5 nm-thick $MnO_2$ coating deposited on them by atomic layer deposition. These coated nickelate particles are incorporated into a cathode, which is then incorporated into an alkaline electrochemical cell comprising a KOH electrolyte solution. The cathode exhibits greater storage stability than an otherwise identical cathode comprising uncoated nickelate particles as the active material.

Example 4

Figure 2:
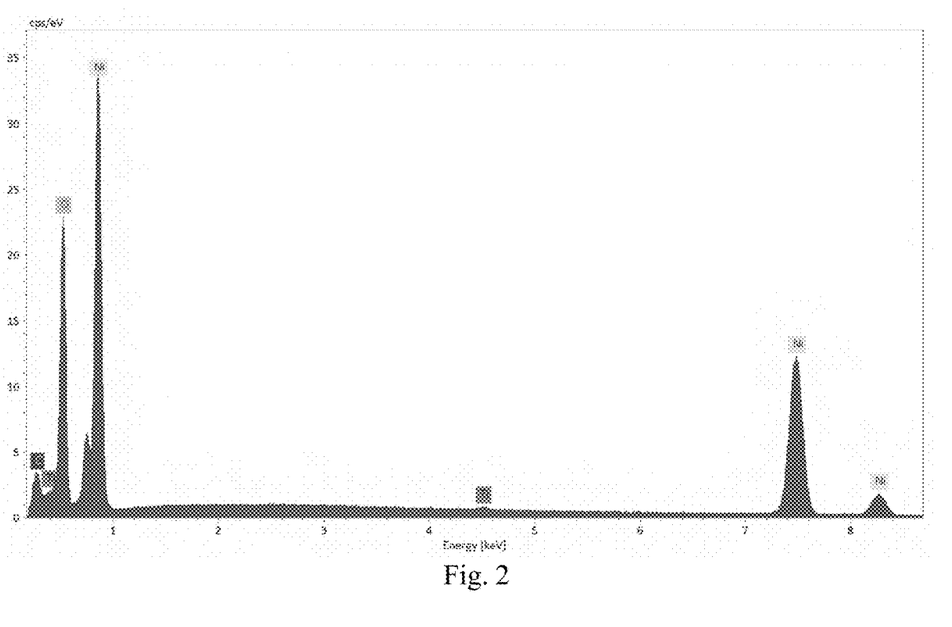
FIG. 2 shows an elemental analysis of $TiO_2$-coated $Li_{1.04}NiO_2$ powders.
Figure 3:
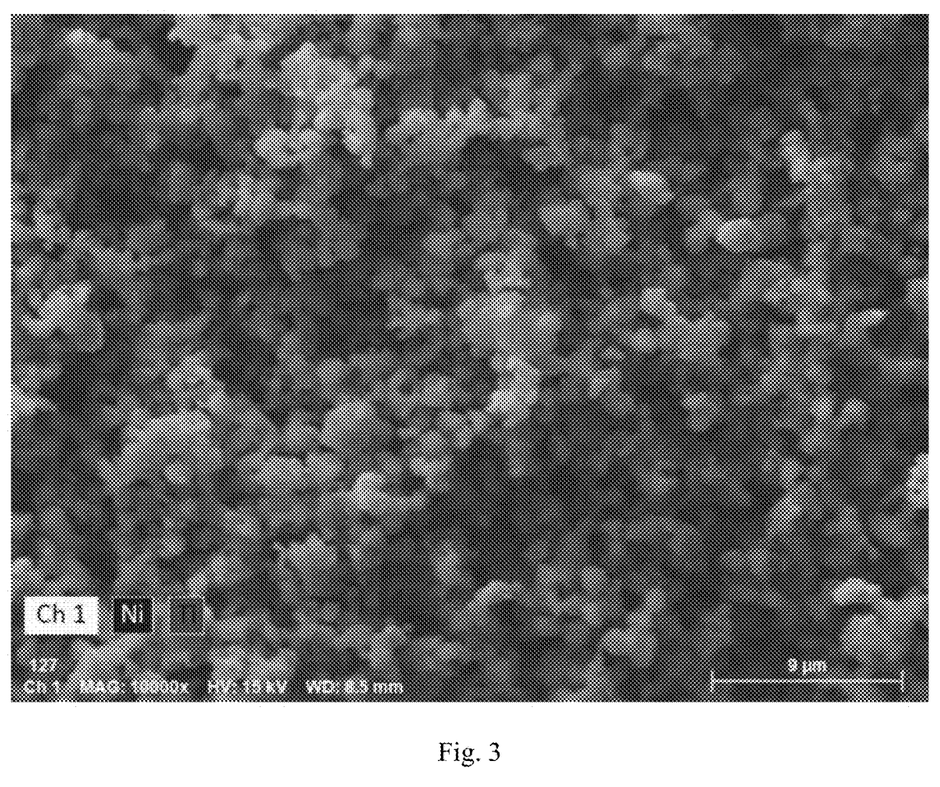
FIG. 3 shows a scanning electron microscope (SEM) image of the $TiO_2$-coated $Li_{1.04}NiO_2$ powders.

Lithium nickel oxide ($LiNiO_2$) was prepared and delithiated by acid leaching in a sulfuric acid solution (H. Arai and Y. Sakurai, J. Power Sources, 81-82 (1999) 401-405). The final composition of the nickelate after the chemical delithiation is $Li_{0.104}NiO_2$ based on inductively coupled plasma atomic. emission spectroscopy (ICP-AES). The nickelate powders were coated with $TiO_2$ by Forge Nano via atomic layer deposition (ALD). The ALD of $TiO_2$ was done on a fluidized bed reactor (D. M. King et al., Surface & Coating Technology, 201 (2007), 9163-9171). The level of coating was controlled by the deposition time or ALD cycle numbers. In the present example, five (5) levels of $TiO_2$ coating were investigated with $TiO_2$ weight percentage from 0.02 wt % to 0.33 wt % based on ICP-AES analysis. The coated nickelate was characterized with scanning electron microcopy/energy dispersive x-ray spectrometry (SEM/EDS). The elemental analysis with EDS in FIG. 2 on the sample with 0.33 wt % $TiO_2$ confirmed the presence of Ti on the powders, and the SEM image in FIG. 3 on the same sample indicated that the $TiO_2$ coating was reasonably uniformly distributed on the powders.

Figure 4:
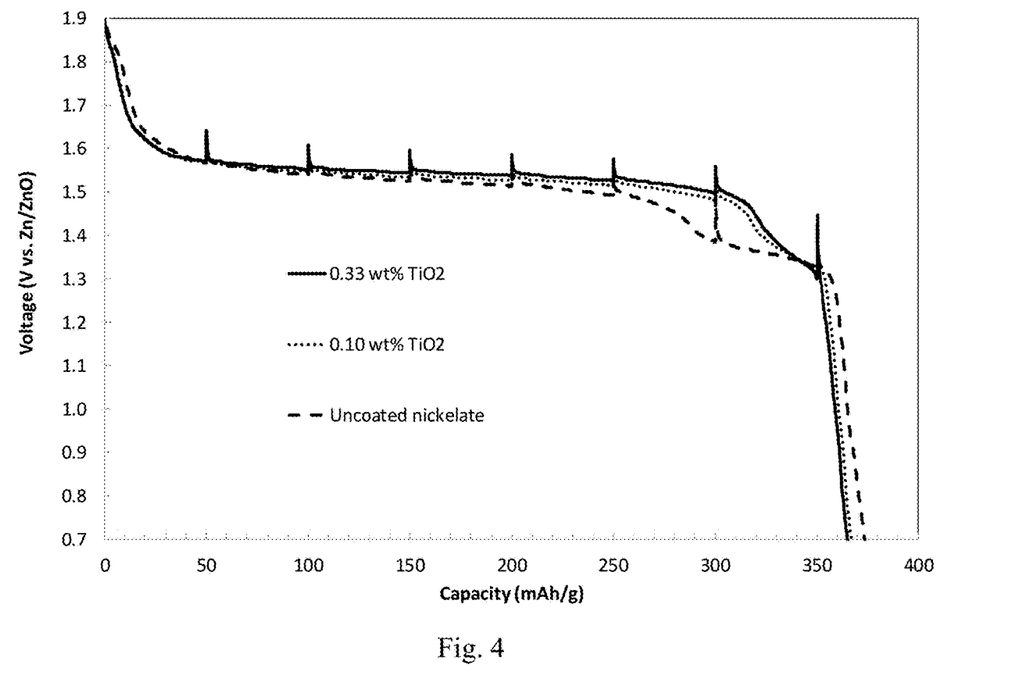
FIG. 4 shows discharge curves for two different $TiO_2$-coated nickelates, along with uncoated nickelate.

The $TiO_2$ coated nickelate powders were tested for their electrochemical performance by mixing 49 wt % of nickelate, 49 wt % of SFG15 graphite conductor and 2 wt % of coathylene binder. 200 mg of the mixture was pressed into a pellet and discharged in 40 wt % KOH/6 wt % ZnO electrolyte vs. a Zn reference electrode. During the discharge, a one-hour rest was given for every five hours of discharge to observe the recovery voltage. Some typical discharge curves of the fresh powders were plotted in FIG. 4, which shows that the $TiO_2$ coating does not have much impact on the discharge capacity of 365 mAh/g. To evaluate the effectiveness of the $TiO_2$ coating on the nickelate stability in electrolyte, the uncoated and $TiO_2$ coated nickelate powders were immersed into 40 wt % KOH/6% wt ZnO electrolyte for 24 hours at room temperature. The weight ratio of electrolyte to powder was 4:1. After a 24-hour immersion, the powders were washed with deionized water and dried at 71° C. overnight. Then, the dried powders were mixed with graphite and binder to form cathode pellets for discharge as described above.

Figure 5:
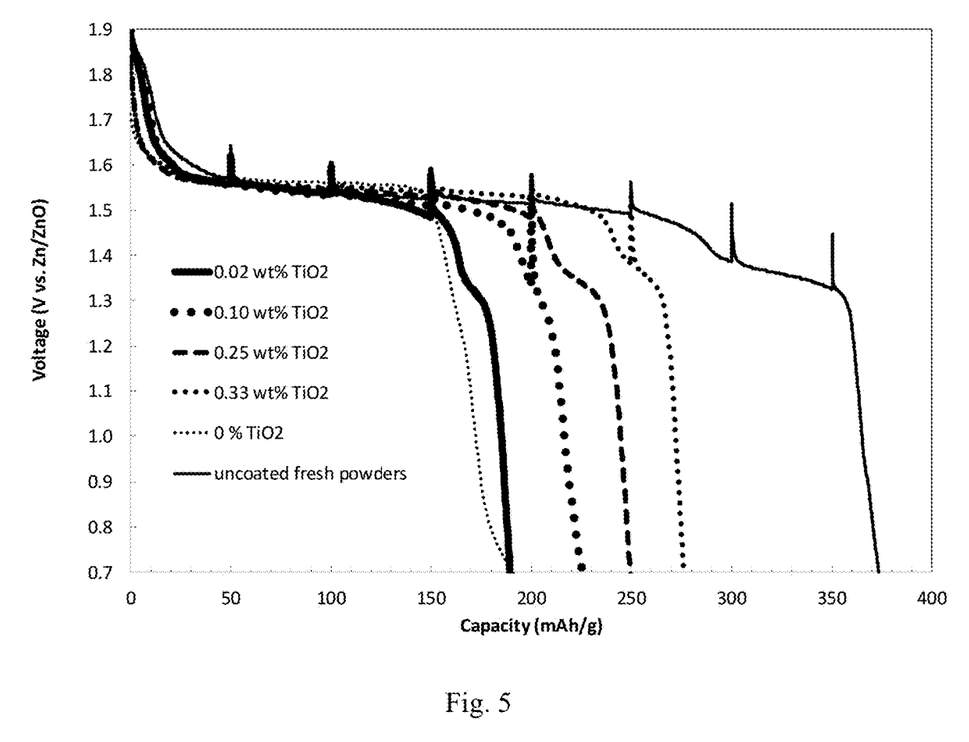
FIG. 5 shows discharge curves for different $TiO_2$-coated nickelates, along with uncoated nickelate, after 24 hours of aging in 40 wt % KOH/6% wt ZnO electrolyte.

FIG. 5 shows that the uncoated nickelate discharge capacity at 1.0 V was decreased from 365 mAh/g to 170 mAh/g after aging. However, the discharge capacity of the $TiO_2$ coated nickelate is significantly higher than the uncoated one after aging in KOH electrolyte. For example, with 0.33 wt % $TiO_2$ coating, the nickelate discharge capacity at 1.0 V improved from 170 mAh/g (uncoated nickelate) to 270 mAh/g after aging.

Example 5

To improve the nickelate's stability in electrolyte, $MnO_2$ was coated on the surface of the nickelate powders synthesized in Example 4 by a redox reaction. The advantage of the $MnO_2$ coating is that the coating also is an active cathode material. First, $MnSO_4 \cdot H_2O$ was added into water or acid electrolytes with pH≤7. Then, nickelate powders were introduced into the electrolyte for a certain period of time. The following redox reaction occurs on the surface of nickelate powders The $MnSO_4$ to nickelate ratio and the reaction time depend upon the desired coating thickness of $MnO_2$ on the nickelate surface. For example, 0.924 grams of $MnSO_4 \cdot H_2O$ was dissolved into 10 grams of 10 wt % $H_2SO_4$ solution. Then 0.5 grams of $Li_{0.104}NiO_2$ powders was added into the solution so that the Mn/Ni molar ratio is 1:1. The solution was continuously stirred with a magnet bar. After 6 hours, the powders were filtered and washed with deionized water until pH neutral. Finally, the powders were dried at 71° C. for 16 hours.

Figure 6:
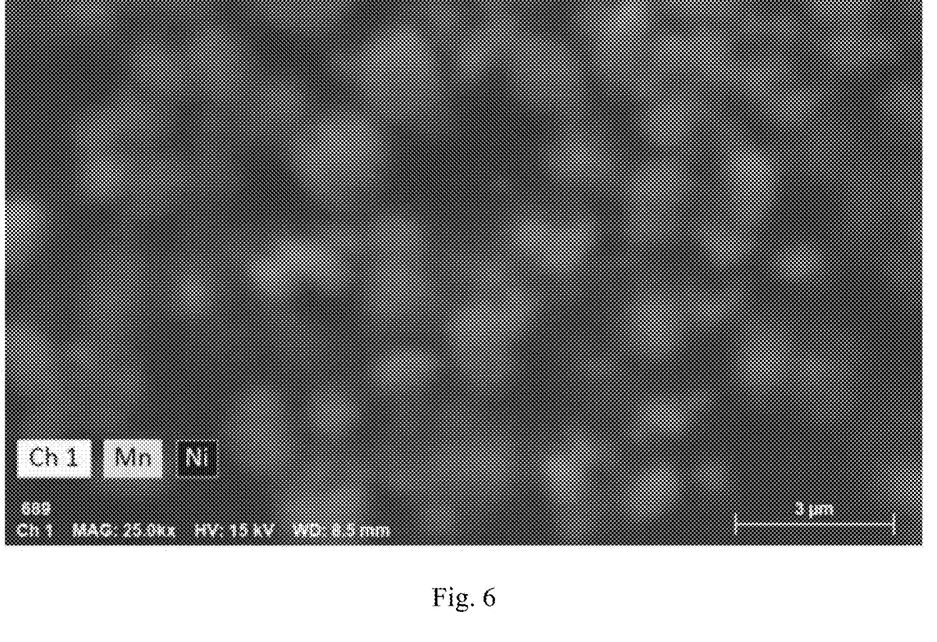
FIG. 6 is a SEM image of a cross-section of $MnO_2$-coated nickelate.

The ICP-AES analysis shows that the weight ratio of nickelate to $MnO_2$ coating is 5 in this example. The powder sample was further mounted in epoxy, cross-sectioned, and polished through 1 μm DiaDuo-2. The SEM image on the cross-sectioned powders in FIG. 6 shows a uniform $MnO_2$ coating on the nickelate particles, and the coating thickness is approximately 70 μm.

Figure 7:
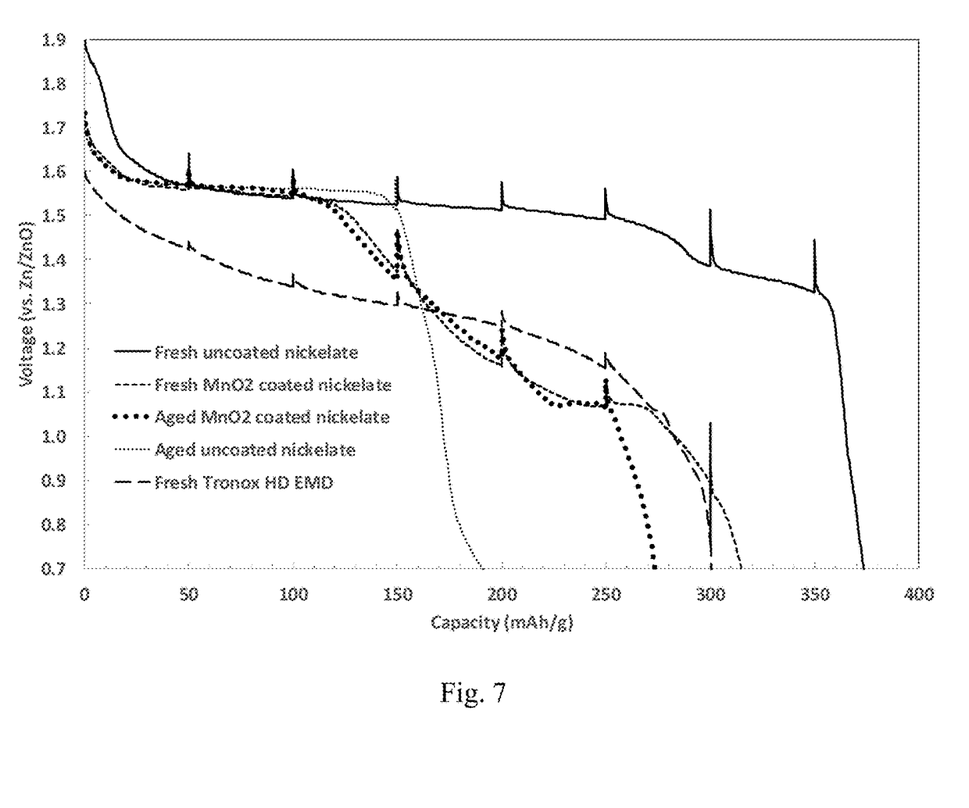
FIG. 7 shows discharge curves of fresh and aged $MnO_2$-coated and uncoated nickelates.

The $MnO_2$ coated nickelate powders were aged and tested in the same way as described above. The discharge curves in FIG. 7 show that the $MnO_2$ coated nickelate has a lower capacity than the unaged nickelate due to the substitution of Mn for Ni. However, the discharge capacities of the $MnO_2$ coated nickelate before and after aging in KOH solution is almost same and higher than the uncoated and aged nickelate.

Therefore, it has been demonstrated that $MnO_2$ coating on nickelate has significantly improved the stability of the nickelate in KOH electrolyte. Furthermore, the $MnO_2$ coated nickelate has a better electrochemical performance than Tronox high drain EMD (electrolytic manganese dioxide) at high voltages, which would significantly improve battery performance on high rate services such as digital still camera (DSC).

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments. Further, the embodiments illustratively disclosed herein suitably may be practiced in the absence of any element which is not specifically disclosed herein.

What is claimed is:

1. An alkaline electrochemical cell, comprising:
    a) a container; and
    b) an electrode assembly disposed within the container and comprising a positive electrode, a negative electrode, a separator located between the positive electrode and the negative electrode, and an alkaline electrolyte;
    wherein the positive electrode comprises coated active material particles, said coated active material particles comprising active material and a coating, wherein the active material comprises a nickel compound; and
    wherein the coating has a thickness of about 0.5 nm-5 nm.

2. The alkaline electrochemical cell of claim 1, wherein the nickel compound is a nickel oxide or a nickel oxyhydroxide.

3. The alkaline electrochemical cell of claim 2, wherein the nickel compound is a nickel oxide selected from the group consisting of a nickel (IV) oxide, nickel dioxide ($NiO_2$), $Li_xNiO_2$ (lithium nickelate), wherein 0<x≤1, and $Li_xA_yNi_{1+a-z}M_zO_2$, wherein 0≤x≤1, 0≤y≤0.3, 0≤a≤0.2, and 0≤z≤0.3, wherein A comprises one or more alkali metals, and wherein M comprises one or more alkaline earth metal, transition metal, other metal, or any combination thereof.

4. The alkaline electrochemical cell of claim 3, wherein the active material is nickel dioxide.

5. The alkaline electrochemical cell of claim 2, wherein the active material is a nickel oxyhydroxide.

6. The alkaline electrochemical cell of claim 1, wherein the coating comprises an insulator.

7. The alkaline electrochemical cell of claim 6, wherein the insulator is an organic material.

8. The alkaline electrochemical cell of claim 6, wherein the insulator is an inorganic material.

9. The alkaline electrochemical cell of claim 1, wherein the coating comprises an electronic conductor or semi-conductor.

10. The alkaline electrochemical cell of claim 9, wherein the electronic conductor or semi-conductor is selected from the group consisting of manganese oxides, carbon, conductive polymers, cobalt oxyhydroxide, and metallic materials.

11. The alkaline electrochemical cell of claim 10, wherein the electric conductor or semi-conductor is a manganese oxide having the formula $MnO_x$, wherein x is from 1.5-2.0 inclusive.

12. The alkaline electrochemical cell of claim 10, wherein the electronic conductor or semi-conductor is a conductive polymer selected from the group consisting of polyaniline, polystyrene sulfonate, and poly(3-hexylthiophene).

13. The alkaline electrochemical cell of claim 1, wherein the coating comprises a second nickel compound, wherein the second nickel compound comprises nickel having a lower oxidation state than that of the nickel in the active material.

14. The alkaline electrochemical cell of claim 13, wherein the second nickel compound is nickel oxyhydroxide or nickel hydroxide.

15. The alkaline electrochemical cell of claim 1, wherein the weight ratio of active material to coating is greater than about 3.

16. The alkaline electrochemical cell of claim 1, wherein the coating comprises a first coating material and a second coating material.

17. A method of producing the alkaline electrochemical cell of claim 1, comprising:
   i) providing a cathode electrode mix comprising
      1) coated active material particles,
      2) binder,
      3) conductive carbon, and
      4) electrolyte,
   ii) forming a plurality of rings from the electrode mix; and
   iii) inserting the rings into a container.

18. A method of producing the alkaline electrochemical cell of claim 1, comprising
   i) providing a cathode electrode mix comprising
      1) coated active material particles,
      2) binder,
      3) conductive carbon, and
      4) electrolyte, and
   ii) using a ram to mold the cathode electrode mix into a solid tubular configuration.

19. The method of claim 17, further comprising, prior to step i), a step of coating cathode active material particles by a method selected from the group consisting of atomic layer deposition, chemical deposition, chemical vapor deposition, electrolytic deposition or plating, electroless deposition or plating, carbon evaporation, laser ablation, and arc discharge.

* * * * *